United States Patent Office

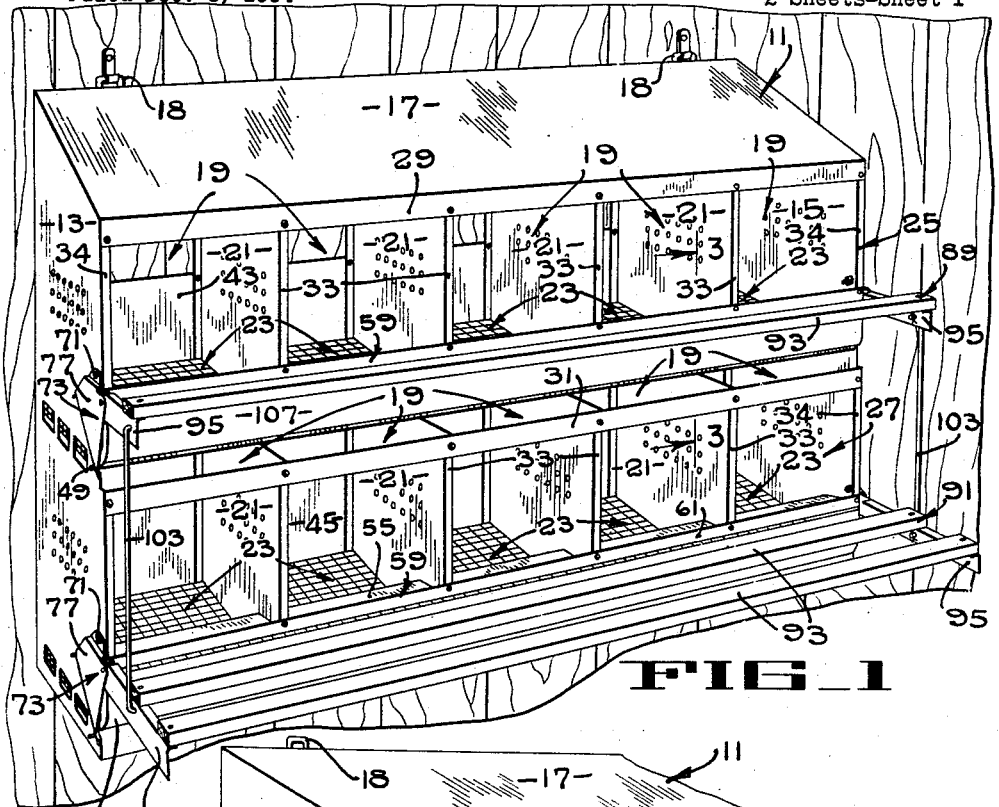

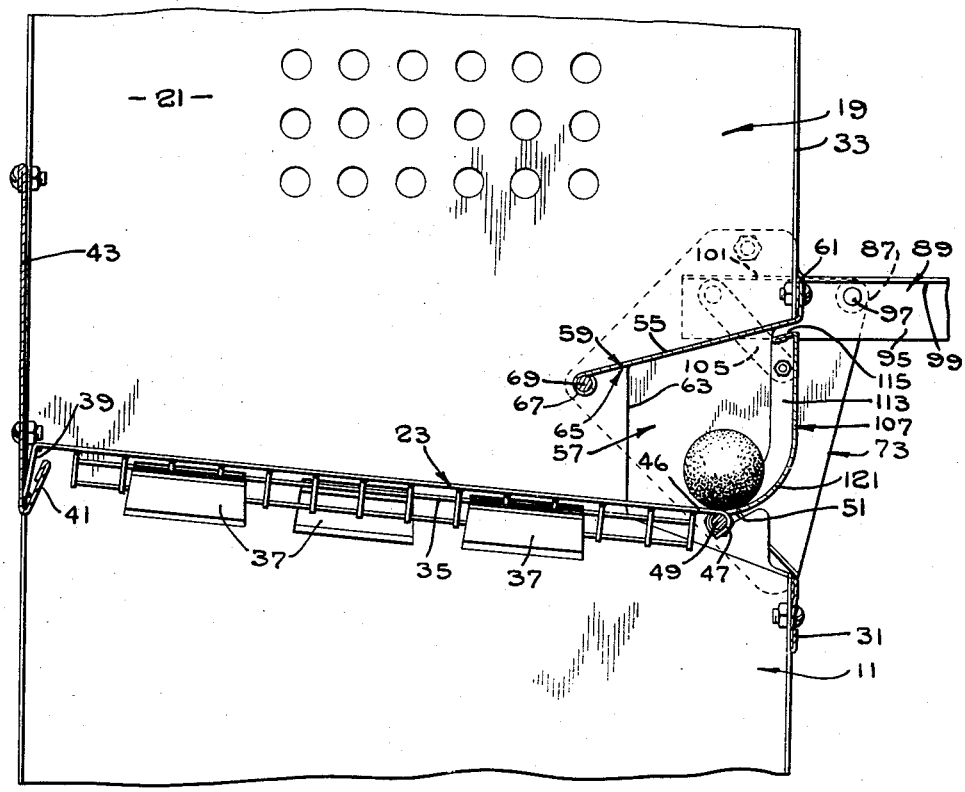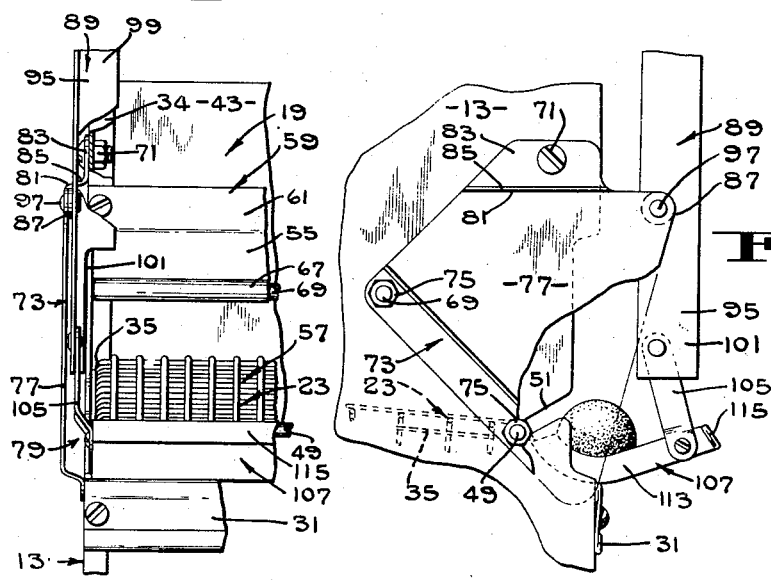

2,833,246
Patented May 6, 1958

2,833,246

LAYING NEST FOR POULTRY

James W. Weber, Tipton, Ind., assignor to Food Machinery and Chemical Corporation, San Jose, Calif., a corporation of Delaware Application December 8, 1954, Serial No. 473,840

12 Claims. (Cl. 119—48)

The present invention pertains to egg laying nests for poultry.

One object of the present invention is to provide a laying nest from which eggs may be conveniently gathered.

Another object is to provide a laying nest in which eggs are gently removed to a protected space immediately after being laid.

Another object is to provide a laying nest which is automatically closed while eggs are being gathered therefrom.

These and other objects and advantages of the present invention will become apparent from the following description and the accompanying drawings in which:

Fig. 1 is a perspective of a battery of poultry laying nests embodying the present invention.

Fig. 2 is a fragmentary perspective of the battery of laying nests shown in Fig. 1, certain structure thereof being shown in a different position.

Fig. 3 is an enlarged vertical section taken along lines 3—3 of Fig. 1, certain parts being broken away.

Fig. 4 is an enlarged fragmentary side elevation of the present battery of laying nests.

Fig. 5 is an enlarged fragmentary front elevation of the present battery of laying nests.

The present invention is here shown embodied in a battery of laying nests comprising a rectangular housing 11 (Fig. 1) having side walls 13 and 15, a forwardly inclined top wall 17 and a bottom wall (not shown). The battery is adapted to be hung on the wall of a poultry coop or the like at a convenient distance above the ground, and for this purpose a pair of spaced eyes 18 are provided at the rear of the top wall 17. The housing 11 is divided into a plurality of open front nests 19 by a plurality of vertical sheet metal partitions 21 and horizontal screen floors 23, said nests being arranged in two superposed horizontal rows 25 and 27. The partitions 21 extend from the top to bottom of the housing and are held in equally spaced parallel relation by upper and lower trim strips 29 and 31 which are bolted to the laterally turned, front flanges 33 of each partition and to similar flanges 34 on the side walls 13 and 15.

The screen floors 23 of the nests 19 extend between the partitions 21, and between the side walls 13 and 15 and the partitions thereadjacent, said floors being sloped forward and downward to permit eggs laid in the nests to roll immediately forward away from the poultry. The floors 23 have their lateral margins bent down as shown at 35 (Fig. 3) and these bent margins rest on tongues 37 projecting from the side walls 13 and 15 and the partitions 21. The rear margin of the floors 23 is also bent down as shown at 39 (Fig. 3) and these rear margins rest on upturned tongues 41 formed along the bottom edge of two, horizontally extending, sheet metal strips 43 and 45 (Fig. 1) secured to the rear of the partitions 21 and serving as low back walls for the nests 19 in the upper and lower rows 25 and 27, respectively. An extending portion 46 (Fig. 3) of the forward margin of the floors 23 is curved backward to form a hook 47 which embraces a rod 49 supported in downwardly and rearwardly extending slots 51 formed in the side walls 13 and 15. By mounting the floors 23 in the above described manner, each floor may be quickly and easily removed for cleaning purposes by swinging the floor upwardly about the rod 49 until the depending lateral and rear margins 35 and 39 clear their supporting tongues 37 and 41, then disengaging the hook 47 from the rod 49 and withdrawing the floor forwardly from the nest. Replacement of the floors 23 is accomplished by reversing the above procedure.

Each nest 19 (Fig. 3) has a downwardly and rearwardly sloped tread 55 spaced above the forward portion of its floor 23. The treads 55 aid the poultry in entering and leaving the nest, and provide compartments 57 in the lower front portion of the nests into which eggs laid in the nests may roll for safe keeping and to permit them to cool. The treads 55 for the nests in each of the rows 25 and 27 are provided in single pieces of sheet metal 59, each piece having a continuous flange 61 at its forward edge bolted to the laterally turned flanges 33 of the partitions 21. Directly below the point of attachment of the flanges 61 to the partitions 21, said partitions are cut out to provide passages 63 for communication between the compartments 57 of adjacent nests 19. The tread pieces 59 extend through the upper portion of the passages 63 and are appropriately slotted at their rear edge to receive the partitions 21, as shown at 65 in Figure 3. The rear edge of each tread piece 59 is provided with a plurality of spaced eyes 67 through which extends a rod 69 that mates with horizontally aligned holes (not shown) in the partitions 21 and the side walls 13 and 15, thus rigidly supporting the tread piece 59 at its rear edge.

The ends of rods 49, 49 and 69, 69 (Fig. 1) which help support the screen floors 23 and the tread pieces 59, respectively, extend laterally beyond the side walls 13 and 15, and in conjunction with nut and bolt assemblies 71 they support a pair of horizontally spaced brackets 73 for each row of nests. The extending ends of the rods 49, 49 and 69, 69 are threaded, and they receive nuts 75 (Fig. 4) which hold the rods in place and securely fasten the brackets 73 to the side walls 13 and 15. The brackets 73 have a trapezium-shaped portion 77 (Fig. 2) that is offset laterally outward from the rest of the bracket to provide a space 79 (Fig. 5) between the bracket and its adjacent battery side wall. The upper edge 81 (Fig. 4) of the trapezium-shaped portion 77 is horizontal and is connected with the upper portion 83 of the bracket by a horizontal web 85 (Fig. 5). The forward part of the trapezium-shaped portion 77 extends forwardly beyond the front edge of the side walls 13 and 15 to form a nose 87.

Perches 89 and 91 (Fig. 1) are provided for the nests 19 in the rows 25 and 27, respectively, said perches being swingably mounted on the brackets 73. The perches 89 and 91 comprise cross bars 93 having support angles 95 fastened at right angles thereto. The angles 95 are pivotally mounted intermediate their ends on the inside of the bracket noses 87 by rivets 97 (Fig. 3), and the laterally extending leg 99 (Fig. 5) of the angles is cut away at its rear end, as shown at 101 (Fig. 5), to enable the rear of the angles to be received in the spaces 79, between the brackets 73 and the side walls. When the perches 89 and 91 are in their normal lowered position the reduced rear portion 101 of their support angles 95 bears against the underside of the bracket web 85; thereby holding the perches in a horizontal plane and in position to assist poultry in entering and leaving the nests. The perches 89 and 91 are operatively connected by links 103 (Fig. 1) so that raising of one perch will also raise the other perch and bring the cross bars 93 of the perches up in front of the nests 19, thereby preventing poultry from entering or leaving the nests.

The perches 89 and 91 are operatively interconnected by means of links 105 (Fig. 2) with elongated doors 107 and 109 for the egg compartments 57 of the nests 19 in the upper and lower rows 25 and 27, respectively. The doors 107 and 109 which form egg abutment means are provided at their inner edge with a plurality of spaced eyes 111 (Fig. 2) by which the doors are swingably mounted on the rods 49. The doors 107 and 109 are J-shaped in cross section, being curved upwardly and outwardly to form a concave surface extending from the rods 49, and they are provided with inturned side and outer end flanges 113 and 115 (Fig. 4). The interconnecting links 105 are pivotally connected to the side flanges 113 of the doors and to the rear portion 101 of the support angles 95, as best seen in Fig. 4. The arrangement of the doors 107 and 109, the perches 89 and 91, and their interconnecting links 105 is such that when the perches are in their lowered position the doors 107 and 109 are closed and the links 105 and reduced portion 101 of the angles 95 are withdrawn into the brackets 73, as seen in Figs. 1 and 3, thereby providing a battery of nests having relatively flush exterior surfaces. When the perches 89 and 91 are raised the doors 107 and 109 are open, as shown in Figs. 4 and 5, and they project forwardly so that eggs in the compartments 57 may roll forward onto them for easy collection.

In use, the present battery of laying nests is fastened to the wall of a poultry coop or the like at a distance from the floor that makes it convenient for poultry to enter and leave the nests and for the eggs to be collected therefrom. When the battery is ready for use, the perches 89 and 91 are placed in their lowered position wherein the nests 19 are open and readily accessible to poultry and the doors 107 and 109 are raised thus closing the front of the compartments 57 and readying them for the retention of eggs received from the nest proper.

When eggs are deposited by poultry on the forwardly and downwardly sloping floors 23 of the nests 19, the eggs promptly roll forwardly into the compartment 57. The eggs are gently brought to rest near the front of the compartments 57 by contact with the inwardly concave inner portion 121 (Fig. 3) of the closed compartment doors 107, 109 which gradually reduces the momentum of the forwardly rolling eggs so that they do not come to rest with a sharp impact which might break them. It is to be noted that the passages 63 provided in the front of partitions 21 permit eggs entering one of the compartments 57 to be deflected into the adjoining compartments in the event that a crowded condition exists in the compartment of the nest in which they were laid. As will be readily apparent from the above, eggs which roll into the compartments 57 are removed from contact with poultry in the nest, and thus may begin to cool immediately after they have been laid. Furthermore, in the compartment 57 the eggs are protected from breakage due to movement of the poultry in the nest and are also protected from contact with droppings and the like, thereby keeping the eggs as clean as possible.

When it is desired to collect the eggs that have been laid in the battery, the poultryman raises the perches 89 and 91, thereby closing the nests 19, as shown in Fig. 2, and preventing the poultry from entering or leaving the same. As the perches 89 and 91 are raised, the doors 107 and 109 operatively connected therewith are caused to swing downwardly and outwardly from their egg arresting position into a generally horizontal egg supporting or retaining position, as shown in Fig. 4. This movement of the doors 107, 109 permits the eggs in the compartments 57 to slowly and gently roll forwardly onto the inner concave portion 121 of the doors, as shown in Figures 2 and 4, where they are readily accessible for gathering by the poultryman. When all of the eggs have been gathered, the poultryman releases the perches 89 and 91 and they automatically return, due to the weight of the perches, to their normal horizontally extending position, thereby reopening the nests 19 for entry or exit of poultry and closing the egg compartment doors 107 and 109 to again condition the compartments 57 for the gentle reception of newly laid eggs.

While I have described a preferred embodiment of the present invention, it will be understood that various changes and modifications may be made in the details thereof without departing from the spirit and scope of the appended claims.

Having thus described the invention, what I claim as new and desire to protect by Letters Patent is:

1. A laying nest for poultry comprising a housing having a substantially uniplanar front, a sloping floor having a fixed position in the housing to enable eggs deposited by poultry on the floor to roll downwardly away from their point of deposit, and an egg abutment means attached to said housing, said abutment means being curved upwardly and outwardly from its point of attachment adjacent the lower portion of the floor into flush relation with said front to contact eggs rolling on the floor and to bring them gently to rest interiorly of said housing.

2. A laying nest for poultry comprising an open front housing, a floor for the housing, an inwardly concave door pivotally mounted on said floor and movable between a position closing a lower portion of said open front to gently arrest eggs rolling on said floor and a position opening said portion to retain eggs thereon for ready access, blocking means on said housing being movable to selectively block or open the upper portion of said open front, and a link interconnecting said blocking means and said door whereby when said blocking means is moved into blocking position said door is moved from a position closing the lower portion of said open front and egg arresting position to open position to retain eggs for ready access.

3. A laying nest for poultry comprising a housing having an open front defining an entrance portion of said housing, a downwardly and forwardly sloping floor for the housing having a lower end disposed adjacent said open front to enable eggs deposited by poultry on the floor to roll forwardly, and an inwardly concave door swingably mounted at the lower end of said floor for movement between a closed position in which eggs rolling forwardly on the floor and against said inwardly concave door are gently brought to rest and an open position in which eggs resting at the lower end of said floor are permitted to roll gently forward onto said door.

4. A laying nest for poultry comprising a housing, a sloping floor for the housing to enable eggs deposited by poultry on the floor to roll downwardly away from their point of deposit, said floor having an upper and a lower end, and means defining an egg protecting compartment within the confines of said housing at the lower end of the floor for receiving eggs deposited on the floor and rolling downwardly thereover, said compartment means including an egg arresting and retaining door pivotally mounted on the lower end of said floor defining an extension thereof and having a concave egg retaining surface to arrest rolling eggs and retain them in the concave surface for permitting collection therefrom.

5. A laying nest for poultry comprising an open front housing having a generally flush front surface, a downwardly and forwardly sloping floor for the housing to enable eggs laid on the floor to roll immediately forward, a door pivotally mounted at the forward portion of the floor and having a concave egg retaining surface to prevent eggs from rolling forwardly off the floor when said door is closed, and a tread spaced above the forward portion of the floor to form with the floor and the door an egg receiving and protecting compartment within the confines of said nest housing, said door being arranged when open to project outwardly beyond the front surface of said housing to retain eggs on said concave surface for easy collection therefrom.

6. A nest structure for poultry comprising an open front housing having a flush front surface, a downwardly and forwardly sloping floor for the housing to enable eggs laid on the floor to roll forward, an egg abutment door pivotally mounted adjacent the forward portion of the floor and disposed within the confines of said housing to prevent eggs from rolling forwardly off the floor, an inclined tread in the housing spaced above said floor and disposed adjacent said door, and substantially upright partitions in the housing dividing the same into nests, each of said partitions having a recess therein disposed entirely within the flush front surface of the housing and below said tread for receiving said door and cooperating with said tread and said floor to define a passage through which eggs may pass so that eggs laid in one nest may roll into the adjacent nest.

7. A laying nest for poultry comprising a housing having an entrance in one side, a floor for the housing, means providing an egg compartment in said housing below said entrance and above said floor, said compartment having an open front below said entrance in said entrance side, egg abutment and retaining means mounted on the housing and being movable between egg arresting position and egg supporting position, a perch mounted on said housing and being movable into and out of entrance closing position, and linkage means interconnecting said perch and said door and operable to move said door into compartment-closed and egg abutting position upon movement of said perch into entrance-open position.

8. A laying nest for poultry comprising a housing having a substantially uniplanar front, a forwardly and downwardly inclined floor in the housing, means defining an egg compartment having an open front and disposed within said housing at the lower end of said floor, said means including a door swingably mounted on the housing and adapted to be disposed in flush relation with said housing front while closing the open front of said egg compartment, and an actuating member connected to said housing and interconnected with said door for opening and closing the door.

9. A laying nest for poultry comprising a housing having an open front and a forwardly and downwardly inclined laying floor, a door of inwardly concave configuration adapted to close the front portion of the housing directly above the floor and swingably mounted on the housing at the forward margin of the floor, said door having two operational positions, a perch swingably mounted on the housing for movement between lowered and raised positions, and a link operatively interconnecting the perch and the door, said link being so constructed and arranged that the door is closed to form an egg abutment surface to arrest eggs rolling on the floor when the perch is in its lowered position and open to retain eggs thereon when the perch is swung to its raised position.

10. In a laying nest for poultry, a housing having an open front, said front being substantially flush, a forwardly and downwardly inclined floor extending from the rear of said housing to a point short of said flush front, a tread at the front of the housing, said tread being spaced above the housing floor to form therewith an egg receiving compartment recessed within the confines of said housing maintaining said front flush, a door of inwardly concave configuration swingably mounted at the front of the housing to open and close the forward portion of the egg receiving compartment immediately above the lower edge of said floor, said door having two operational positions, a perch at the front of the housing swingably mounted for movement between a lowered position and a raised position wherein it lies across the open front of said housing, and a link operatively interconnecting said perch and said door, said link being so constructed and arranged that it opens the door to retain eggs thereon when the perch is swung to its raised position and closes the door to form an egg abutment surface when the perch is swung to its lowered position.

11. A laying nest for poultry comprising a housing having oppositely disposed side walls defining a front opening, an inclined nest floor in the housing, a door hinged to the forward edge of the floor to close the opening, a laterally offset bracket on each side wall at opposite sides of the nest, said brackets each providing a horizontal web and a forwardly projecting nose, a perch structure having transversely extending support angles projecting from one side, said perch structure angles being pivotally supported intermediate their ends on the projecting noses of the opposite laterally offset brackets for movement from a substantially horizontal position with the free ends of the angles in engagement with said webs to a substantially vertical position, and a link having one end pivotally attached adjacent the free end of each of said perch structure angles and the other end to the opposite sides of said door adjacent its outer end whereby when the free ends of the perch angles contact the horizontal webs of said brackets said door is held in position to close said opening and when the angles of said perch structure are substantially vertical said door is held in open position.

12. A laying nest for poultry comprising a housing having an opening in a front wall, a sloping floor having a lower end disposed within the housing terminating adjacent said opening and arranged to direct eggs deposited on said floor to roll downwardly thereon toward said opening, a door movably mounted on said housing at the lower end of the floor to close the lower portion of said opening and retain eggs on said floor adjacent said opening, and entrance blocking means pivoted on said housing for movement into and out of position to block the upper portion of said opening, said blocking means being interconnected with said door for movement of said door into a position to open said lower portion of said opening when said blocking means is moved into opening-blocking position.

References Cited in the file of this patent

UNITED STATES PATENTS

| 1,610,220 | Olson | Dec. 7, 1926 |
| 1,891,161 | Johnston | Dec. 13, 1932 |
| 2,158,831 | Plante | May 16, 1939 |
| 2,633,826 | Hansen | Apr. 7, 1953 |
| 2,640,461 | Dadlow | June 2, 1953 |
| 2,683,438 | Peterson | July 13, 1954 |
| 2,692,578 | Manning | Oct. 26, 1954 |
| 2,695,006 | Tellefson | Nov. 23, 1954 |
| 2,728,324 | Radocy | Dec. 27, 1955 |